United States Patent
Watanabe et al.

(10) Patent No.: US 12,283,169 B2
(45) Date of Patent: Apr. 22, 2025

(54) MONITORING SYSTEM, MONITORING METHOD, AND RECORDING MEDIUM

(71) Applicant: NEC Corporation, Tokyo (JP)

(72) Inventors: Yasushi Watanabe, Tokyo (JP); Takuji Ogawa, Tokyo (JP); Yukio Nada, Tokyo (JP); Sayuri Watanabe, Tokyo (JP)

(73) Assignee: NEC CORPORATION, Tokyo (JP)

(*) Notice: Subject to any disclaimer, the term of this patent is extended or adjusted under 35 U.S.C. 154(b) by 16 days.

(21) Appl. No.: 18/279,515

(22) PCT Filed: Mar. 5, 2021

(86) PCT No.: PCT/JP2021/008761
§ 371 (c)(1),
(2) Date: Aug. 30, 2023

(87) PCT Pub. No.: WO2022/185541
PCT Pub. Date: Sep. 9, 2022

(65) Prior Publication Data
US 2024/0153369 A1 May 9, 2024

(51) Int. Cl.
*H04N 7/18* (2006.01)
*G06V 20/52* (2022.01)
(Continued)

(52) U.S. Cl.
CPC ............ *G08B 21/02* (2013.01); *G06V 20/52* (2022.01); *G06V 40/161* (2022.01); *G06V 40/175* (2022.01); *H04N 7/183* (2013.01)

(58) Field of Classification Search
CPC .. G08B 21/02; G08B 13/19613; G08B 21/24; G08B 25/00; G08B 25/04; G06V 20/52;
(Continued)

(56) References Cited

U.S. PATENT DOCUMENTS

| 10,531,238 B2 * | 1/2020 | Nagasaka ............. H04W 4/027 |
| 2004/0003411 A1 * | 1/2004 | Nakai ............... H04N 21/47202 |
| | | 348/E7.071 |

(Continued)

FOREIGN PATENT DOCUMENTS

| JP | 2006-092396 A | 4/2006 |
| JP | 2007-060528 A | 3/2007 |

(Continued)

OTHER PUBLICATIONS

International Search Report for PCT Application No. PCT/JP2021/008761, mailed on May 25, 2021.
(Continued)

*Primary Examiner* — Tung T Vo
(74) *Attorney, Agent, or Firm* — Sughrue Mion, PLLC

(57) ABSTRACT

Provided is a monitoring system that provides appropriate notification in accordance with whether or not a person to be monitored is with a registered companion. This monitoring system is provided with: a recognition unit which recognizes a person to be monitored and a registered companion associated with the person to be monitored; and a notification unit which notifies a prescribed contact that the person to be monitored has been recognized. When it is recognized that the person to be monitored is with the registered companion, the notification unit refrains from notifying the contact.

12 Claims, 18 Drawing Sheets

(51) Int. Cl.
*G06V 40/16* (2022.01)
*G08B 21/02* (2006.01)

(58) Field of Classification Search
CPC .. G06V 40/161; G06V 40/175; G06V 40/172; H04N 7/183; H04N 7/18
USPC .......................................................... 348/143
See application file for complete search history.

(56) References Cited

U.S. PATENT DOCUMENTS

| | | | | |
|---|---|---|---|---|
| 2019/0098454 | A1* | 3/2019 | Nagasaka | H04W 4/027 |
| 2021/0216754 | A1* | 7/2021 | Kumada | G06V 20/52 |
| 2021/0279450 | A1 | 9/2021 | Niino | |
| 2023/0368639 | A1* | 11/2023 | Takada | G06Q 10/06 |

FOREIGN PATENT DOCUMENTS

| | | |
|---|---|---|
| JP | 2007-148675 A | 6/2007 |
| JP | 2008-003690 A | 1/2008 |
| JP | 2008-113184 A | 5/2008 |
| JP | 2017-111506 A | 6/2017 |
| JP | 2018-169942 A | 11/2018 |
| JP | 2018-201176 A | 12/2018 |
| JP | 2019-021002 A | 2/2019 |
| JP | 2019-057183 A | 4/2019 |
| JP | 2019-091162 A | 6/2019 |
| JP | 2021-026317 A | 2/2021 |
| WO | 2010/103584 A1 | 9/2010 |
| WO | 2015/133195 A1 | 9/2015 |
| WO | 2018/146938 A1 | 8/2018 |

OTHER PUBLICATIONS

English translation of Written opinion for PCT Application No. PCT/JP2021/008761, mailed on May 25, 2021.

JP Office Action for JP Application No. 2023-503330, mailed on Jun. 4, 2024 with English Translation.

JP Office Action for JP Application No. 2023-503330, mailed on Nov. 5, 2024 with English Translation.

* cited by examiner

Fig.3

| IDENTIFICATION ID | REGISTERED COMPANION IDENTIFICATION ID | CONTACT DETAIL |
|---|---|---|
| A1 | C2 | X2 |
| ... | ... | ... |

FACE IMAGE OF CHILD

○○ (NAME OF CHILD) HAS PASSED
△△ (PLACE) TOGETHER WITH
□□ (NAME OF REGISTERED COMPANION).

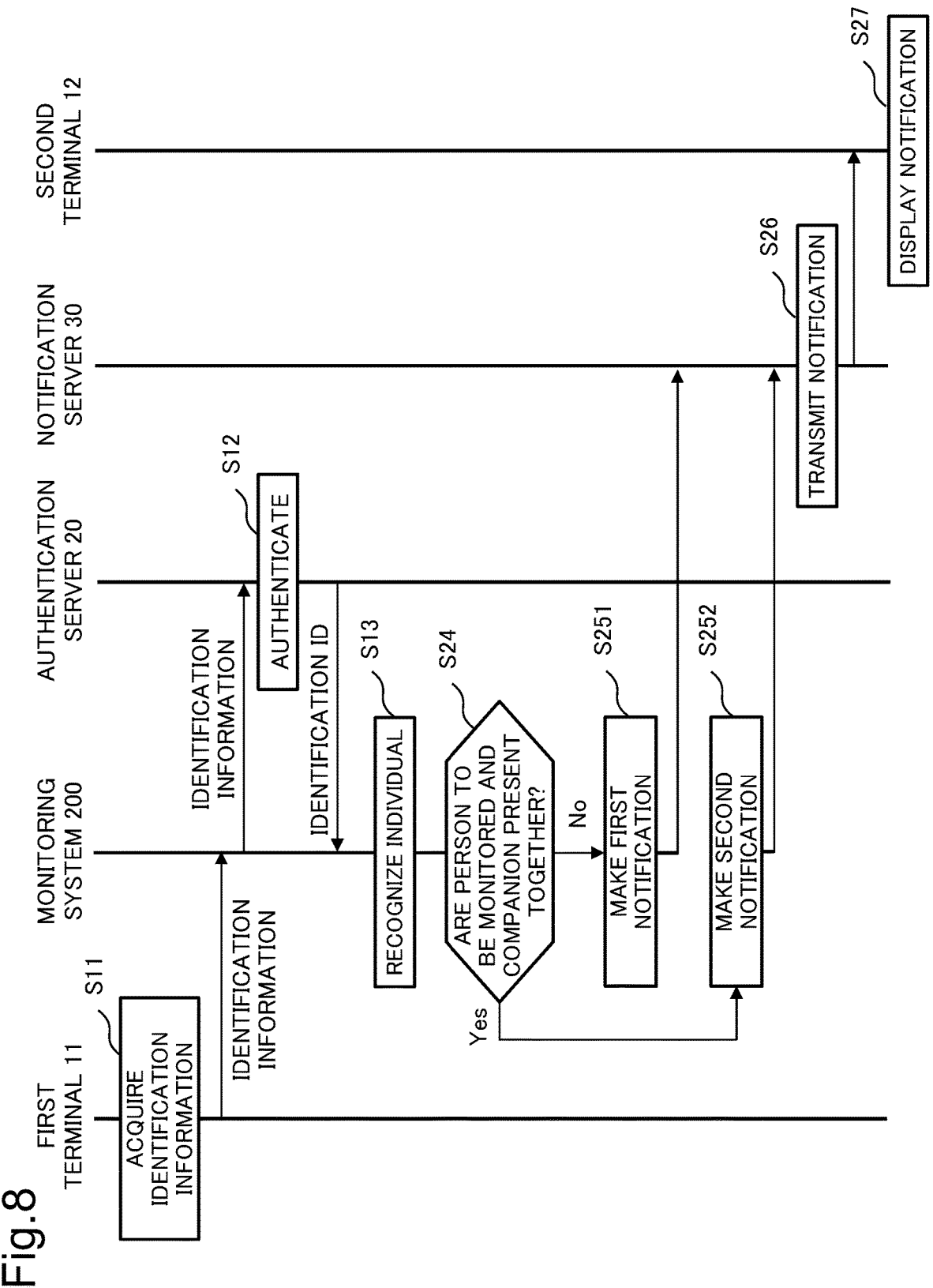

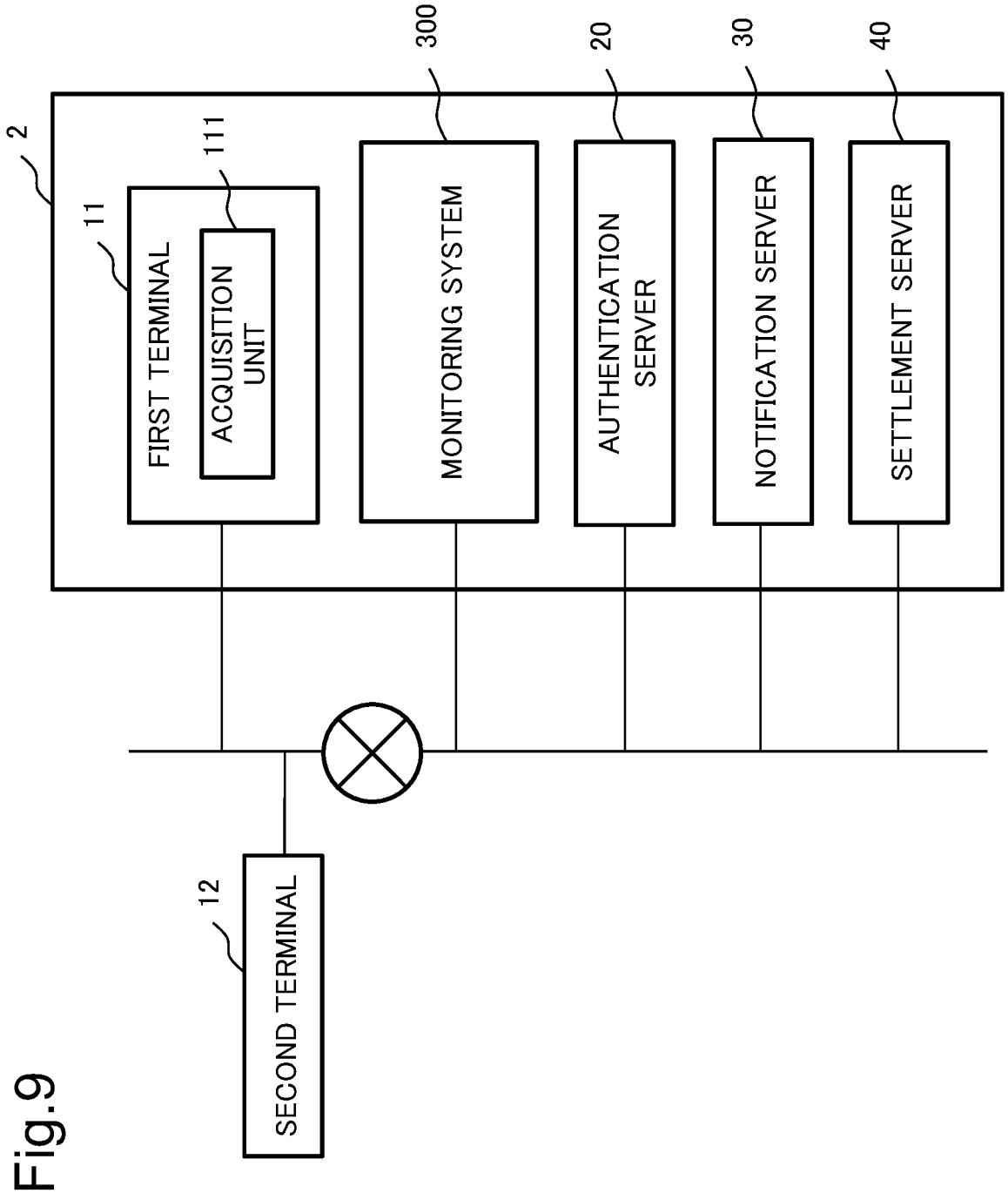

Fig.11

| IDENTIFICATION ID | REGISTERED COMPANION IDENTIFICATION ID | CONTACT DETAIL | PAYMENT METHOD |
|---|---|---|---|
| A1 | C2 | X2 X3 | P2 |
| C2 | – | X2 | P2 |
| ... | ... | ... | ... |

Fig.12A

SUBJECT: SETTLEMENT COMPLETED

MESSAGE:
THANK YOU FOR USING (SERVICE NAME).
PLEASE BE INFORMED OF USE BY MR./MS. ○○ (NAME) AT △△ (PLACE).

BOARDING BUS: ROUTE ###
GETTING-OFF BUS STOP: ○○ (FACILITY NAME)

TRANSACTION AMOUNT: XXX YEN
SLIP NUMBER: XXXXXXX
DATE AND TIME OF USE: 2020/07/09, 15:03:13
STORE NAME: ☐ ☐ ☐ ☐ ☐ STORE

Fig.12B

SUBJECT: SETTLEMENT COMPLETED

MESSAGE:
THANK YOU FOR USING (SERVICE NAME).
PLEASE BE INFORMED OF USE BY MR./MS. ○○ (NAME) AT △△ (PLACE).

TRANSACTION AMOUNT: XXX YEN
SLIP NUMBER: XXXXXXX
DATE AND TIME OF USE: 2020/07/09, 15:03:13
STORE NAME: ☐ ☐ ☐ ☐ ☐ STORE

Fig.13

| IDENTIFICATION ID | REGISTERED COMPANION IDENTIFICATION ID | CONTACT DETAIL | | PAYMENT METHOD |
|---|---|---|---|---|
| A1 | C2 | IN A CASE WHERE A1 IS PRESENT ALONE | SETTLEMENT NOTIFICATION TO X2, MONITORING NOTIFICATION TO X3 | P1 |
| | | IN A CASE WHERE A1 IS PRESENT TOGETHER WITH C2 | SETTLEMENT NOTIFICATION TO X2 | P2 |

MONITORING SYSTEM, MONITORING METHOD, AND RECORDING MEDIUM

This application is a National Stage Entry of PCT/JP2021/008761 filed on Mar. 5, 2021, the contents of all of which are incorporated herein by reference, in their entirety.

TECHNICAL FIELD

The present disclosure relates to a monitoring system and the like.

BACKGROUND ART

A system for confirming that a child or an elderly person is in a predetermined place is known.

PTL 1 discloses a monitoring system that facilitates search in a case where a child or an elderly person goes out and is missing. In PTL 1, a camera that detects a person to be monitored is installed at a doorway of a room or a building. When the person to be monitored is detected, an e-mail is transmitted to the registered address. In PTL 1, when the user turns on the switch of the camera at the timing of moving away from the person to be monitored, the monitoring system starts monitoring. PTL 1 discloses that when a guardian of a person to be monitored goes out together, the user turns off the switch.

PTL 2 discloses a vehicle management server in a monitoring pickup system in which a vehicle monitors a person to be monitored during pickup and drop-off. In PTL 2, information to be notified to the watcher is extracted from a video captured by the in-vehicle camera according to a set condition. For example, the setting condition refers to limitation to the video in which the person to be monitored appears or designation of a specific place and time zone.

CITATION LIST

Patent Literature

PTL 1: JP 2017-111506 A
PTL 2: JP 2018-169942 A

SUMMARY OF INVENTION

Technical Problem

When the person to be monitored is present together with the guardian, the notification may be unnecessary. However, when the notification is unnecessary as in PTL 1, it is troublesome to perform the operation every time. PTL 2 does not consider that a person to be monitored is present together with a guardian.

An object of the present disclosure is to provide a monitoring system or the like that makes an appropriate notification according to whether a person to be monitored is present together with a companion.

Solution to Problem

A monitoring system according to the present disclosure includes a recognition means configured to recognize a person to be monitored and a registered companion associated with the person to be monitored, and a notification means configured to make a notification, to a predetermined contact detail, that the person to be monitored has been recognized, wherein the notification means stops a notification to the contact detail in a case where it is recognized that the person to be monitored and the registered companion are present together.

A monitoring system according to the present disclosure includes a recognition means configured to recognize a person to be monitored and a registered companion associated with the person to be monitored, and a first notification means configured to make a first notification in a case where it is recognized that the person to be monitored and the registered companion are not present together, and the system makes a second notification different from the first notification in a case where it is recognized that the person to be monitored and the registered companion are present together.

A monitoring method according to the present disclosure includes recognizing a person to be monitored and a registered companion associated with the person to be monitored, and making a notification, to a predetermined contact detail, that the person to be monitored has been recognized and stopping a notification to the contact detail in a case where it is recognized that the person to be monitored and the registered companion are present together.

A monitoring method according to the present disclosure includes recognizing a person to be monitored and a registered companion associated with the person to be monitored, and making a first notification in a case where it is recognized that the person to be monitored and the registered companion are not present together and making a second notification different from the first notification in a case where it is recognized that the person to be monitored and the registered companion are present together.

A recording medium according to the present disclosure non-transiently records a program for causing a computer to execute the steps of recognizing a person to be monitored and a registered companion associated with the person to be monitored, and making a notification, to a predetermined contact detail, that the person to be monitored has been recognized and stopping a notification to the contact detail in a case where it is recognized that the person to be monitored and the registered companion are present together.

A recording medium according to the present disclosure non-transiently records a program for causing a computer to execute the steps of recognizing a person to be monitored and a registered companion associated with the person to be monitored, making a first notification in a case where it is recognized that the person to be monitored and the registered companion are not present together, and making a second notification different from the first notification in a case where it is recognized that the person to be monitored and the registered companion are present together.

Advantageous Effects of Invention

According to the present disclosure, it is possible to make an appropriate notification according to whether a person to be monitored is present together with a companion.

BRIEF DESCRIPTION OF DRAWINGS

FIG. 3 is a diagram illustrating an example of information stored in a user database.

FIG. 8 is a sequence diagram illustrating an operation example of an information system 1 according to the second example embodiment.

FIG. 9 is a block diagram illustrating a configuration of an information system 2 according to the third example embodiment.

FIG. 11 is a diagram illustrating an example of information stored in a user database.

FIG. 12A is a diagram illustrating an example of a notification transmitted by a notification unit 202.

FIG. 12B is a diagram illustrating another example of a notification transmitted by the notification unit 202.

FIG. 13 is a diagram illustrating another example of information stored in the user database.

EXAMPLE EMBODIMENT

Hereinafter, a monitoring system according to an aspect of the example embodiment of the present disclosure will be described with reference to the drawings. Hereinafter, in each example embodiment, in a case where the person to be monitored is recognized, a notification to the contact detail of the person who remotely monitors the safety of the person to be monitored is performed. The person who has received the notification can confirm the safety of the person to be monitored.

First Example Embodiment

In a case where it is recognized that the person to be monitored is present together with a companion associated in advance with the person to be monitored, the monitoring system according to the first example embodiment does not make a notification to the registered contact detail. The registered companion is a person who accompanies the person to be monitored to ensure safety. The registered companion may be the same as or different from a person to which the notification is made. The registered companion is also referred to as a guardian or a protection responsible person.

For example, in a case where the person to be monitored is an elderly person, the registered companion is a relative, a care giver or the like. For example, in a case where the person to be monitored is a child, the registered companion is a parent, a relative or an acquaintance who is requested by the parent to pick up the child, a school related person, or the like. For example, the monitoring system according to the first example embodiment makes a notification to the parent in a case where the child is recognized. However, for example, in a case where it is recognized that the child is present together with the registered companion, the monitoring system does not make a notification to the parent.

(Configuration)

Figure 1:
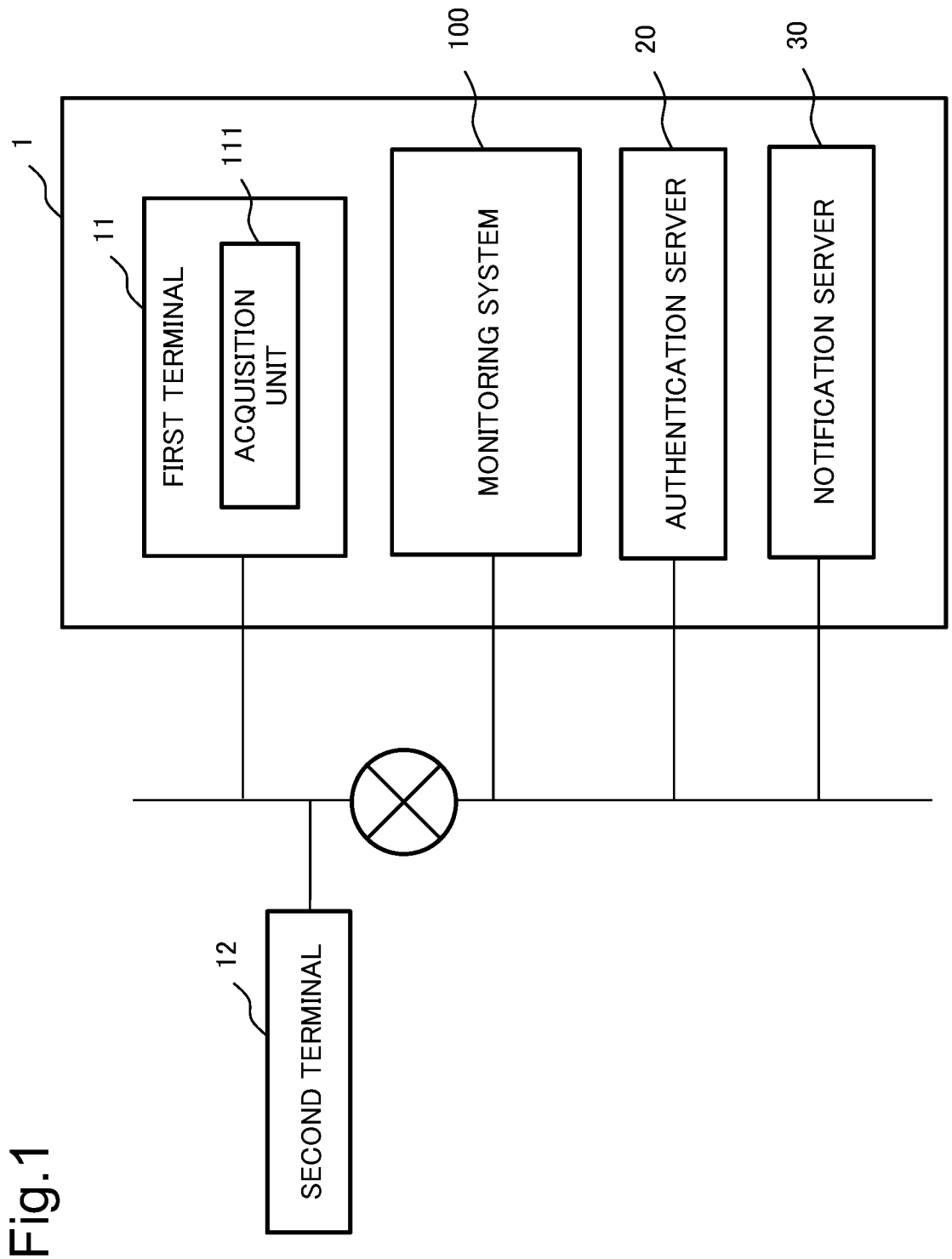
FIG. 1 is a block diagram illustrating a configuration of an information system 1 according to the first example embodiment.

FIG. 1 is a block diagram illustrating a configuration of an information system 1 according to the first example embodiment. The information system 1 includes a first terminal 11, a monitoring system 100, an authentication server 20, and a notification server 30. The first terminal 11, the monitoring system 100, the authentication server 20, and the notification server 30 are connected in a wired or wireless manner through a network. Notification server 30 may be connected to a second terminal 12 in a wired or wireless manner through a network.

The first terminal 11 is installed in a place used by the person to be monitored, such as a facility, a building, or a vehicle. The first terminal 11 may be installed at a predetermined place such as a nursing home, a school, an after-school facility, a house, a station, an entrance or an exit of a bus, or a ticket gate of a train. The first terminal 11 may be, for example, a smartphone, a tablet, a personal computer, or another terminal. The first terminal 11 includes an acquisition unit 111.

The acquisition unit 111 acquires identification information used for authentication. The acquisition unit 111 transmits the acquired identification information to the monitoring system 100.

The acquisition unit 111 may acquire biometric information used for biometric authentication as the identification information. The biometric information is, for example, information about a face, an iris, a fingerprint, a blood vessel, a voiceprint, and the like. The biometric information may be, for example, a face image or a feature amount acquired from the face image. In a case where the biometric information is information related to a face, the acquisition unit 111 may be a camera.

The second terminal 12 is a terminal used by a guardian or an assistant who receives a remote notification of a person to be monitored such as a child or an elderly person. The second terminal 12 is, for example, a mobile terminal, a smartphone, a tablet, or a personal computer. The second terminal 12 receives and displays the notification from the notification server 30. A plurality of the second terminals 12 may be provided depending on use of the person who is notified of the person to be monitored, or the second terminals 12 may not be used in some cases.

Figure 2:
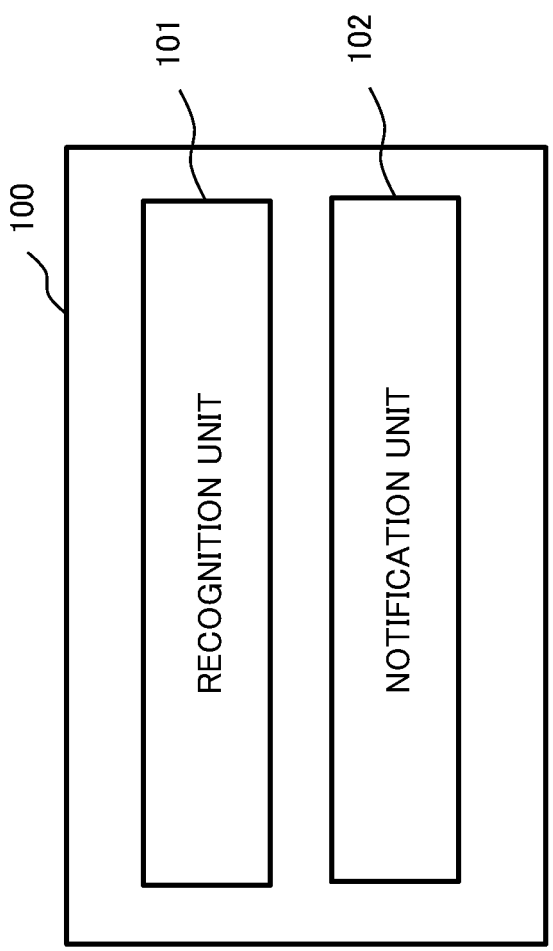
FIG. 2 is a block diagram illustrating a configuration of a monitoring system 100 according to the first example embodiment.

FIG. 2 is a block diagram illustrating a configuration of the monitoring system 100 according to the first example embodiment. The monitoring system 100 includes a recognition unit 101 and a notification unit 102. The monitoring system 100 refers to a user database (DB) (not illustrated).

FIG. 3 is a diagram illustrating an example of information stored in the user DB. The user DB includes an identification ID (identifier) of the user. The user includes at least a person to be monitored. The user may include a user, other than the person to be monitored, who uses the facility where the first terminal 11 is installed or the transportation system. The identification ID is an identifier for uniquely identifying the user.

The identification ID of the person to be monitored is associated with the identification ID of the registered companion and a predetermined contact detail. The identification ID of the registered companion is an identification ID of a person registered in association with the person to be monitored. A plurality of registered companions may be registered for one person to be monitored. The predetermined contact detail is, for example, a destination to which a notification regarding the person to be monitored is made, such as a contact detail of a guardian or an assistant. The contact detail is, for example, an email address, a telephone number, or a messaging application account. The contact detail may be information that uniquely identifies the second terminal 12. A plurality of contact details may be registered for one person to be monitored. The user DB may include an identification ID or a contact detail of a user who is not a person to be monitored.

For example, the recognition unit 101 recognizes an individual based on the identification information received from the acquisition unit 111 of the first terminal 11. The recognition unit 101 may recognize an individual when entering or leaving a facility, or when getting on or off a vehicle. For example, when recognizing an individual, the recognition unit 101 recognizes whether the person whose identification information has been acquired is a person to be monitored and a registered companion. In a case where the face image is used as the identification information, the recognition unit 101 recognizes the person to be monitored and the registered companion based on the face image captured at a predetermined place where the first terminal is installed. Further, the recognition unit 101 recognizes whether the person to be monitored and the registered companion are present together.

Specifically, for example, the recognition unit 101 recognizes an individual by transmitting the identification information received from the first terminal 11 to the authentication server 20 and receiving the authentication result from the authentication server 20. The recognition unit 101 may receive an identification ID common to the user DB as the authentication result. The recognition unit 101 refers to the user DB and determines whether the identification ID is an identifier of the person to be monitored. Further, the recognition unit 101 may refer to the user DB and determine whether the identification ID is the identifier of the registered companion.

For example, when the registered companion is recognized within a predetermined time before and after the person to be monitored is recognized, the recognition unit 101 may recognize that the person to be monitored and the companion are present together. Alternatively, when the acquisition unit 111 is a camera and the person to be monitored and the companion are imaged within the imaging range of one camera, or when the faces of the person to be monitored and the companion are simultaneously photographed by a plurality of cameras, the recognition unit 101 may recognize that the person to be monitored and the companion are present together. In a case where the registered companion is not recognized within a predetermined time after the person to be monitored is recognized, the recognition unit 101 may recognize that the person to be monitored is alone.

When the person to be monitored is recognized, the notification unit 102 makes a notification to a predetermined contact detail. However, in a case where it is recognized that the person to be monitored and the registered companion are present together, the notification unit 102 does not make a notification.

Specifically, for example, the notification unit 102 refers to the user DB to transmit a notification request to the notification server 30 in such a way as to transmit a notification to a contact detail associated with the person to be monitored. A form of the notification is not particularly limited. It may be, for example, an email to an email address, a short message service (SMS) to a phone number, or a message to a messaging application account.

The authentication server 20 receives the identification information from the monitoring system 100, and authenticates the user with reference to an identification information DB (not illustrated). The identification information DB stores, for example, an identification ID and identification information in association with each other. The authentication server 20 transmits the authentication result to the monitoring system 100.

The notification server 30 is, for example, a mail server or a messaging application server. The notification server 30 transmits the notification to the designated contact detail based on the notification request from the notification unit 102 of the monitoring system 100. The notification indicates that the person to be monitored has been recognized. The notification server 30 transmits the notification to the second terminal 12, for example. The person who has received the notification can know that the person to be monitored has been recognized by the monitoring system.

Figure 4:
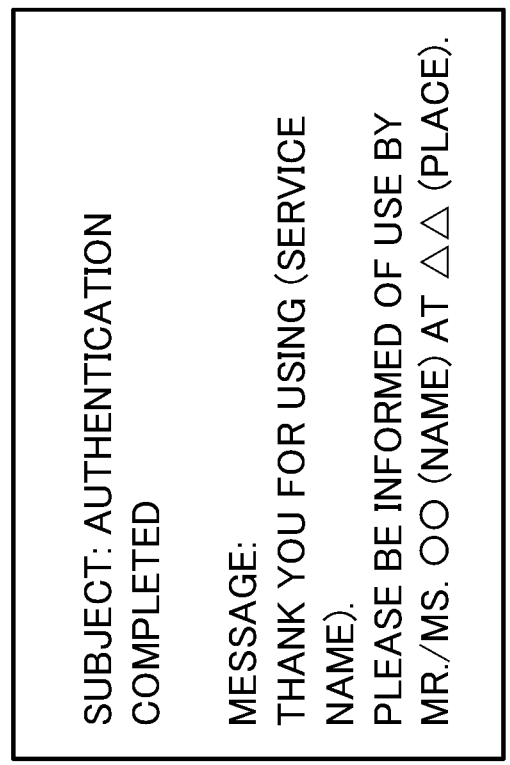
FIG. 4 is a diagram illustrating an example of a notification displayed by a second terminal 12.

FIG. 4 is a diagram illustrating an example of the notification displayed by the second terminal 12. FIG. 4 illustrates an example of a case where the notification is in the form of a mail. The mail in FIG. 4 is also referred to as a monitoring notification mail, and includes the name of the person to be monitored and the place where the person to be monitored is recognized.

(Operation)

Figure 5:
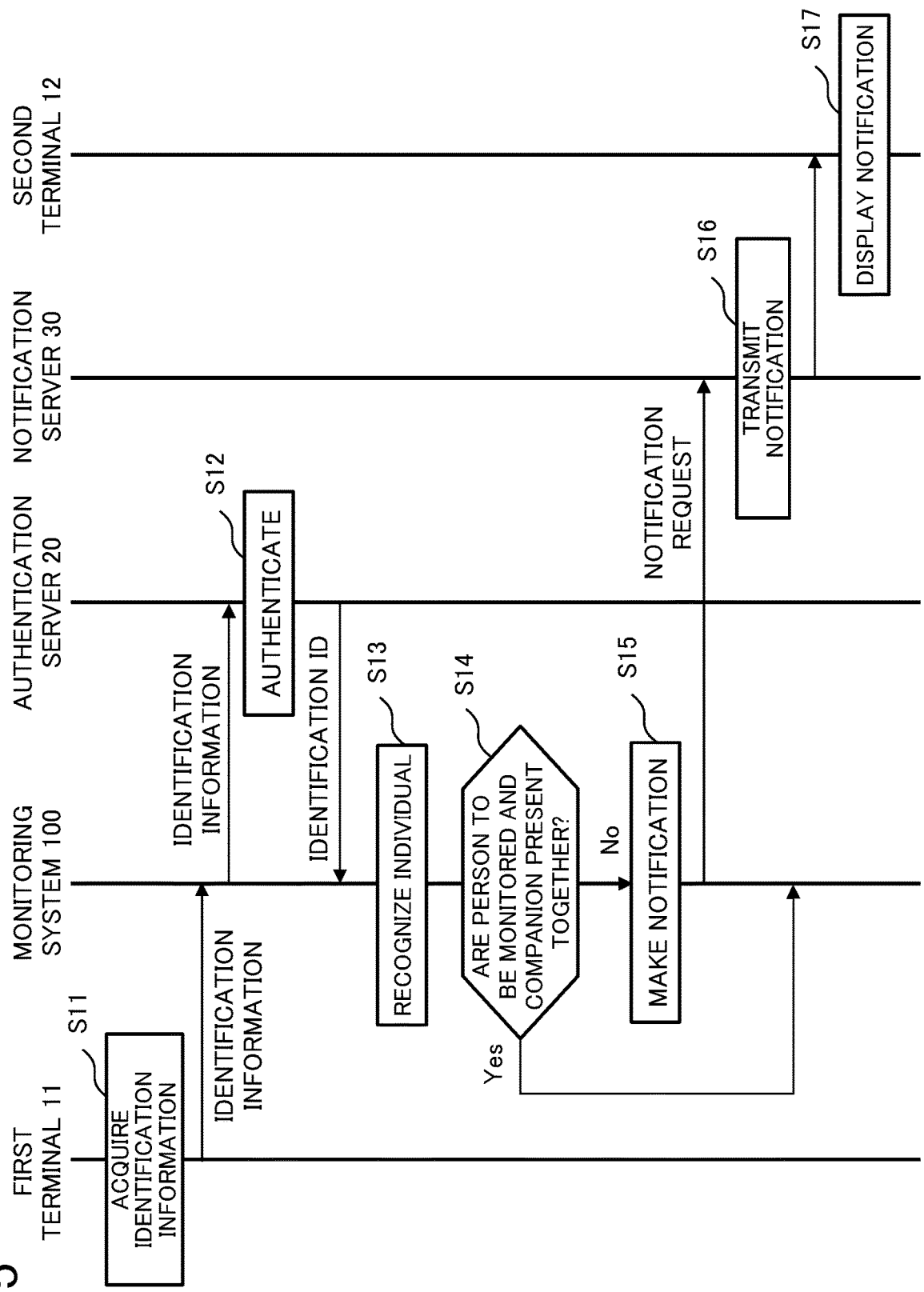
FIG. 5 is a sequence diagram illustrating an operation example of the information system 1 according to the first example embodiment.

Hereinafter, an operation example of the information system 1 according to the first example embodiment will be described. FIG. 5 is a sequence diagram illustrating an operation example of the information system 1.

First, the acquisition unit 111 of the first terminal 11 acquires identification information used for authentication (step S11). The acquisition unit 111 transmits the acquired identification information to the monitoring system 100.

The recognition unit 101 of the monitoring system 100 transmits the identification information to the authentication server 20. The monitoring system 100 may process the identification information received from the first terminal 11 and then transmit the processed identification information to the authentication server 20.

The authentication server 20 receives the identification information from the monitoring system 100 and authenticates the user (step S12). The authentication server 20 transmits the identification ID related to the identification information to the monitoring system 100. The recognition unit 101 of the monitoring system 100 recognizes an individual based on the identification ID received from the authentication server 20 (step S13). For example, the recognition unit 101 recognizes the person to be monitored and the registered companion. For example, every time the first terminal 11 acquires the identification information, the information system 1 repeats the processing of steps S11 to S13. When acquiring the identification information of the plurality of persons simultaneously or continuously, the acquisition unit 111 may transmit the plurality of pieces of identification information to the monitoring system 100 in association with each other.

Then, the recognition unit 101 recognizes that the person to be monitored is not with the registered companion or is present together with the registered companion. For example, in a case where the recognition unit 101 does not recognize the registered companion within a predetermined time after recognizing the person to be monitored, it recognizes that the person to be monitored is not present together with the registered companion. The recognition unit 101 transmits to the notification unit 102 the fact that the person to be monitored is not present together with the registered companion.

When the person to be monitored is not present together with the registered companion (step S14: No), the notification unit 102 makes a notification (step S15). Specifically, the notification unit 102 transmits a notification request to the notification server 30 in such a way as to transmit a notification to a contact detail associated with the person to be monitored. The notification server 30 transmits a notification to the designated contact detail based on the notification request from the notification unit 102 of the monitoring system 100 (step S16). For example, notification server 30 transmits the notification to the second terminal 12. The second terminal 12 displays the notification (step S17).

When the person to be monitored and the companion are present together (step S14: Yes), the notification unit 102 does not make a notification.

(Effects)

According to the first example embodiment, it is possible to make an appropriate notification according to whether the person to be monitored is present together with the registered companion. Specifically, for example, it is convenient because the person who is to receive the notification of the person to be monitored does not need to perform the setting every time when the notification is unnecessary. The reason is that the recognition unit 101 recognizes the person to be monitored and the registered companion, the notification unit 102 make a notification when the person to be monitored is recognized, and does not make a notification in a case where it is recognized that the person to be monitored and the registered companion are present together.

Specifically, for example, the person who is to receive the notification of the person to be monitored can obtain confirmation that the person to be monitored is at a predetermined place. By using the biometric information as confirmation, impersonation is difficult, compared with that in a case where other identification information is used, so that the person who is to receive the notification can feel relieved.

Second Example Embodiment

In the second example embodiment, the content or destination of the notification is different between a case where the person to be monitored is not present together with a companion (registered companion) associated with the person to be monitored and a case where the person to be monitored is present together with the companion.

(Configuration)

Figure 6:
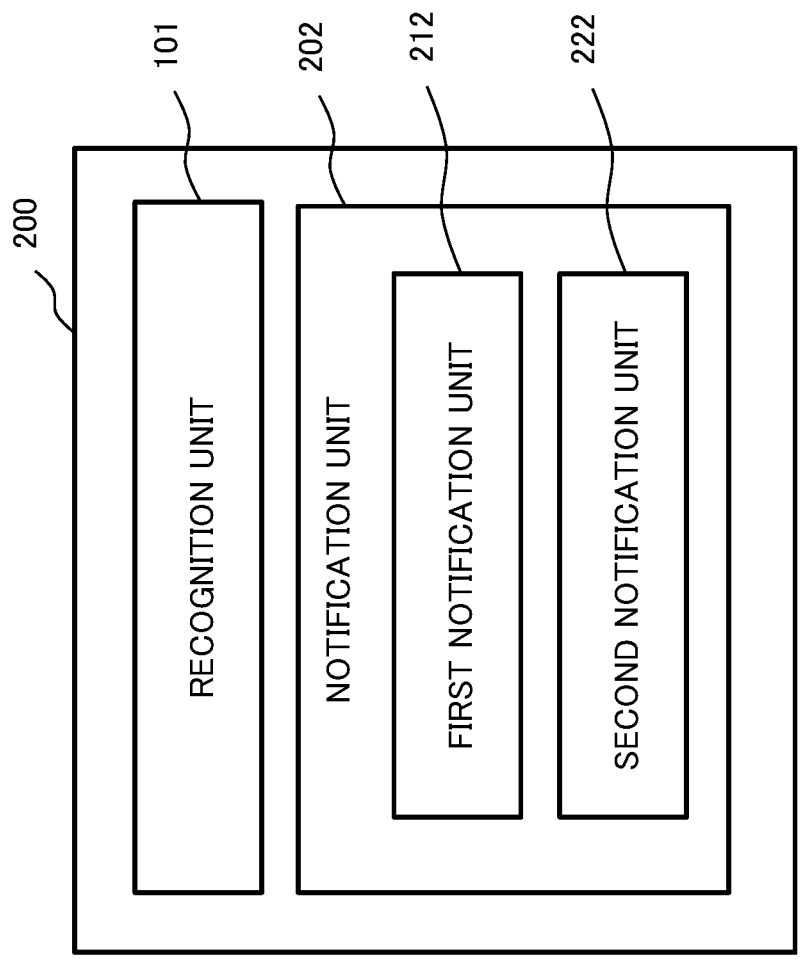
FIG. 6 is a block diagram illustrating a configuration of a monitoring system 200 according to the second example embodiment.

The information system 1 according to the second example embodiment includes a monitoring system 200 instead of the monitoring system 100 in the information system 1 according to the first example embodiment. FIG. 6 is a block diagram illustrating a configuration of the monitoring system 200 according to the second example embodiment. The monitoring system 200 includes the recognition unit 101 and a notification unit 202. The notification unit 202 includes a first notification unit 212 and a second notification unit 222.

The configuration of the recognition unit 101 is similar to the configuration of the recognition unit 101 according to the first example embodiment.

When the person to be monitored is recognized, the notification unit 202 makes a notification to the contact detail stored in the user DB. The first notification unit 212 makes the first notification in a case where it is recognized that the person to be monitored and the registered companion are not present together. In a case where it is recognized that the person to be monitored and the registered companion are present together, the second notification unit 222 makes a second notification different from the first notification. Each of the first notification unit 212 and the second notification unit 222 transmits a notification request to the notification server 30 in such a way that the notification server 30 makes a notification to a contact detail associated with the person to be monitored.

<Contents and Destination of Notification>

The first notification and the second notification have different contents, for example. The content of the first notification includes, for example, that the person to be monitored is not present together with the registered companion. The content of the second notification includes, for example, that the person to be monitored and the registered companion are present together.

Alternatively, the content of the first notification may include additional information related to the person to be monitored, and the content of the second notification may not include the additional information. The additional information may be the image of the person to be monitored acquired by the acquisition unit 111. In addition to the image of the person to be monitored, the additional information may be, for example, the type of bus on which the person to be monitored rides or the time when the person to be monitored is recognized.

Figures 7A, 7B:
FIG. 7A is a diagram illustrating an example of a content of a first notification.
FIG. 7B is a diagram illustrating an example of a content of a second notification.

FIGS. 7A and 7B are diagrams illustrating examples of contents notified by the notification unit 202. FIG. 7A illustrates an example of the content of the first notification. FIG. 7B illustrates an example of the content of the second notification. For example, the first notification includes the image of the person to be monitored as the additional information, and the second notification does not include the image of the person to be monitored. For example, when the first notification includes a face image of the child, the parent can confirm that the child is correctly recognized and can feel relieved. When the second notification does not include a face image, communication data volume can be saved.

The first notification and the second notification may be addressed differently, for example. That is, the first notification unit 212 makes a notification to the first contact detail, and the second notification unit 222 makes a notification to a second contact detail different from the first contact detail. The first notification and the second notification may be different in both content and destination.

When the notification destinations are different, the user DB stores a first contact detail that is a destination of the first notification and a second contact detail that is a destination of the second notification. When there is a plurality of destinations of the first notification, the destination of the second notification may include the destination of the first notification. For example, in a case where the person to be monitored is recognized alone, the notification is made to a plurality of destinations such as a relative, a school, and a police. In a case where it is recognized that the person to be monitored is present together with the registered companion, the notification is made to a contact detail of a close relative.

(Operation)

FIG. 8 is a sequence diagram illustrating an operation example of the information system 1 according to the second example embodiment. The operation of the information system 1 according to the second example embodiment is similar to the operation according to the first example embodiment. For example, the information system 1 performs processing similar to that in steps S11 to S13 in FIG. 5.

In step S13, the recognition unit 101 recognizes whether the recognized individual is a person to be monitored and a registered companion. Next, the recognition unit 101 determines whether the person to be monitored and the registered companion are present together. When the person to be monitored and the registered companion are not present together (step S24: No), the first notification unit 212 makes the first notification (step S251). Specifically, the first notification unit 212 requests the notification server 30 to transmit the notification in the content of the first notification or to the destination of the first notification. When the person to be monitored and the registered companion are present together (step S24: Yes), the second notification unit 222 makes the second notification (step S252). Specifically, the second notification unit 222 requests the notification server 30 to make a notification of the content of the second notification or to the destination of the second notification.

The notification server 30 transmits a notification to the designated contact detail based on the notification request from the monitoring system 200 (step S26). For example, notification server 30 transmits the notification to the second terminal 12. The second terminal 12 displays the notification (step S27).

(Effects)

According to the second example embodiment, it is possible to make an appropriate notification according to whether the person to be monitored is present together with the registered companion. Specifically, for example, it is possible to make an appropriate notification to the person who is to receive the notification of the person to be monitored. This is because the first notification unit 212 makes the first notification in a case where it is recognized that the person to be monitored and the registered companion are not present together, and the second notification unit 222 makes the second notification different from the first notification in a case where it is recognized that the person to be monitored and the registered companion are present together.

Third Example Embodiment

The third example embodiment is different from the first and second example embodiments in that it further includes a function for a person to be monitored to make a settlement. In the third example embodiment, the content or destination of the notification is different between a case where the person to be monitored is not together with the registered companion and a case where the person to be monitored is present together with the registered companion.

(Configuration)

FIG. 9 is a block diagram illustrating a configuration of an information system 2 according to the third example embodiment. The information system 2 is different from the above-described example embodiments in that it includes a monitoring system 300 instead of the monitoring systems 100 and 200. Furthermore, the information system 2 includes a settlement server 40. Configurations of the first terminal 11, the second terminal 12, the authentication server 20, and the notification server 30 are similar to those in the above-described example embodiment.

The first terminal 11 can be installed at a place where accounting is performed, such as a store, in addition to an entrance and an exit of a bus, a ticket gate of a train, and the like. When each user makes a settlement, identification information is acquired in the first terminal 11.

Figure 10:
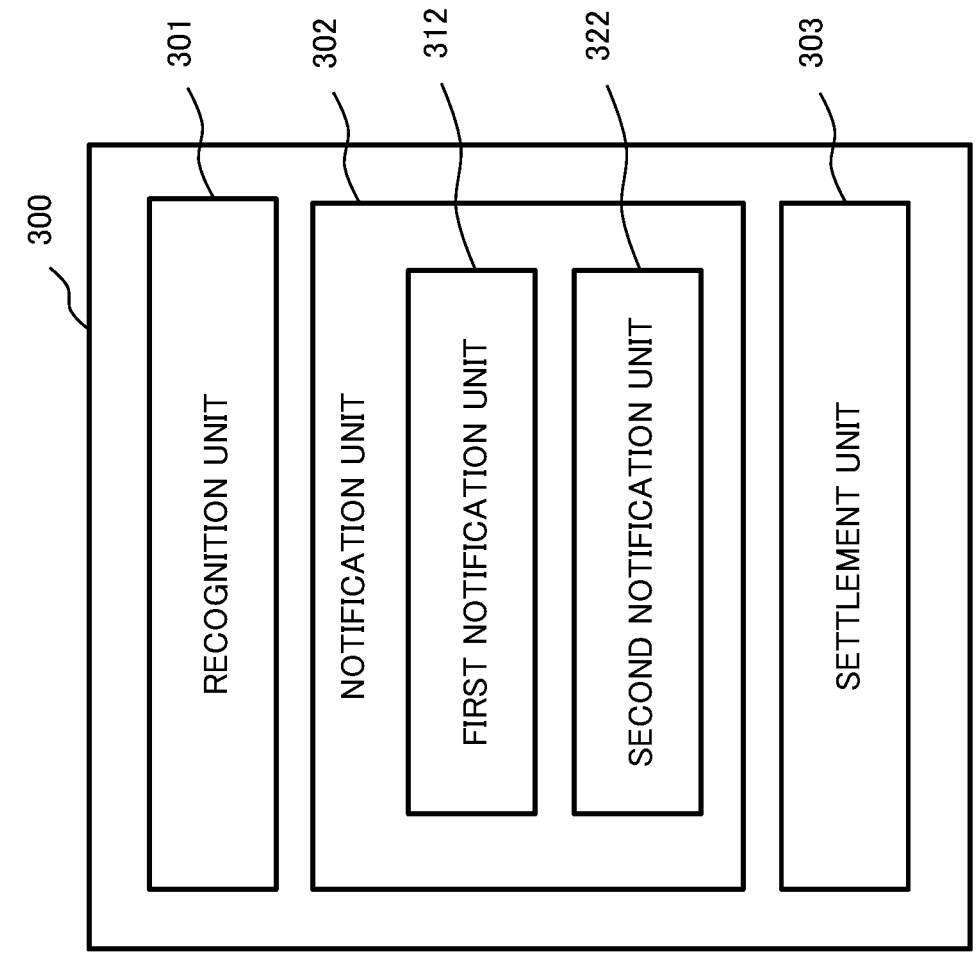
FIG. 10 is a block diagram illustrating a configuration of a monitoring system 300.

FIG. 10 is a block diagram illustrating a configuration of the monitoring system 300. The monitoring system 300 includes a recognition unit 301, a notification unit 302, and a settlement unit 303. FIG. 11 is a diagram illustrating an example of information stored in the user DB referred to by the monitoring system 300. The user DB according to the third example embodiment is different from the user DB of FIG. 3 in that a payment method is further stored in association with each identification ID. The contact detail included in the user DB may be a contact detail to which a notification regarding settlement is made.

The payment method may be any of prepayment, immediate payment, and post-payment. The user DB stores information about any settlement means such as electronic money settlement, credit card settlement, or debit card settlement. For example, when the person to be monitored is a child, the payment method associated with the identification ID of the child may be a parent's credit card.

The configuration of the recognition unit 301 is basically similar to the configuration of the recognition unit 101 according to the first and second example embodiments. The recognition unit 301 recognizes the person to be monitored and the registered companion using, for example, identification information acquired for settlement. The recognition unit 301 may recognize the person to be monitored and the registered companion using the authentication result acquired for settlement. For example, the recognition unit 301 recognizes an individual at the time of settlement. The recognition unit 301 may determine whether the person to be monitored is present together with the registered companion.

The configuration of the notification unit 302 is basically similar to the configuration of the notification unit 202 according to the second example embodiment. When the person to be monitored is recognized and the settlement is completed, the notification unit 302 makes a notification to a predetermined contact detail stored in the user DB. The notification unit 302 includes a first notification unit 312 and a second notification unit 322. The first notification unit 312 makes the first notification in a case where it is recognized that the person to be monitored and the registered companion are not present together. In a case where it is recognized that the person to be monitored and the registered companion are present together, the second notification unit 322 makes a second notification different from the first notification.

The settlement unit 303 makes a settlement based on the identification information acquired by the acquisition unit 111 of the first terminal 11. Specifically, for example, the settlement unit 303 transmits the identification information received from the first terminal 11 to the authentication server 20, and receives the authentication result. The settlement unit 303 may receive an identification ID common to the user DB as the authentication result. The settlement unit 303 refers to the user DB, communicates with the settlement server 40, and makes a settlement by a payment method associated with the identification ID. The settlement unit 303 receives the settlement result from the settlement server 40.

<Contents and Destination of Notification>

As described in the second example embodiment, in the third example embodiment, the first notification and the second notification may be different depending on whether the additional information is included. FIGS. 12A and 12B are diagrams illustrating examples of the notifications transmitted by the notification unit 202. For example, a case where FIG. 12A represents the first notification and FIG. 12B represents the second notification will be described. The first notification and the second notification may each include settlement information. The settlement information includes at least one of a money amount, a payment method, or a slip number. The settlement information may include a settlement date and time or a settlement place (store name). The first notification in FIG. 12A includes, as the additional information, the route number of the bus on which the person to be monitored gets on and information on the bus stop at which the person to be monitored gets off. Since the notification of each of FIGS. 12A and 12B includes the settlement information, it is also referred to as a settlement notification.

Alternatively, the first notification may be different from the second notification in that the first notification includes a fact that settlement has been made by the person to be monitored while the registered companion is not present together, and the second notification includes a fact that settlement has been made by the person to be monitored when the registered companion is present together.

Alternatively, the first notification and the second notification may be different in both the destination and the content. FIG. 13 is a diagram illustrating a data example of the user DB in a case where both the destination and the content are different. For example, the first notification unit 212 may send, as the first notification, both the monitoring notification of FIG. 4 and the settlement notification of FIG. 12B to predetermined contact details. Specifically, as illustrated in the first line of FIG. 13, in a case where A1 is recognized alone, the first notification unit 212 makes a notification to the destination of X2 of the settlement notification and the destination of X3 of the monitoring notification. The second notification unit 222 may send, as the second notification, the settlement notification of FIG. 12B to a predetermined contact detail. In this case, the second notification is different from the first notification in that the second notification does not include the monitoring notification to be notified to the predetermined contact detail. Specifically, as illustrated in the second line of FIG. 13, in a case where it is recognized that A1 and C2 are present together, the second notification unit 222 notifies the destination of X2 of the settlement notification.

A plurality of payment methods may be associated with the identification ID. The settlement unit 303 may make a settlement by different payment methods between a case where the person to be monitored is alone and a case where the person to be monitored is present together with the registered companion. The recognition unit 301 may transmit a result of determining whether the person to be monitored is present together with the registered companion to the settlement unit 303. The settlement unit 303 makes a settlement based on the determination result.

<Settlement Using Face Image>

The monitoring system 2 may use a face image as the identification information. In this case, the settlement unit 303 may make a settlement using the face image. The recognition unit 301 may recognize the person to be monitored and the registered companion based on the face image acquired for settlement. At this time, as illustrated in FIG. 7A, the second notification may include a face image acquired for settlement as the additional information.

When settlement can be made using the face image of the person to be monitored, the person to be monitored does not need to carry a medium for settlement, which is convenient. Furthermore, by using the face image acquired for settlement also for the monitoring notification, the face image can be effectively used.

(Operation)

Figure 14:
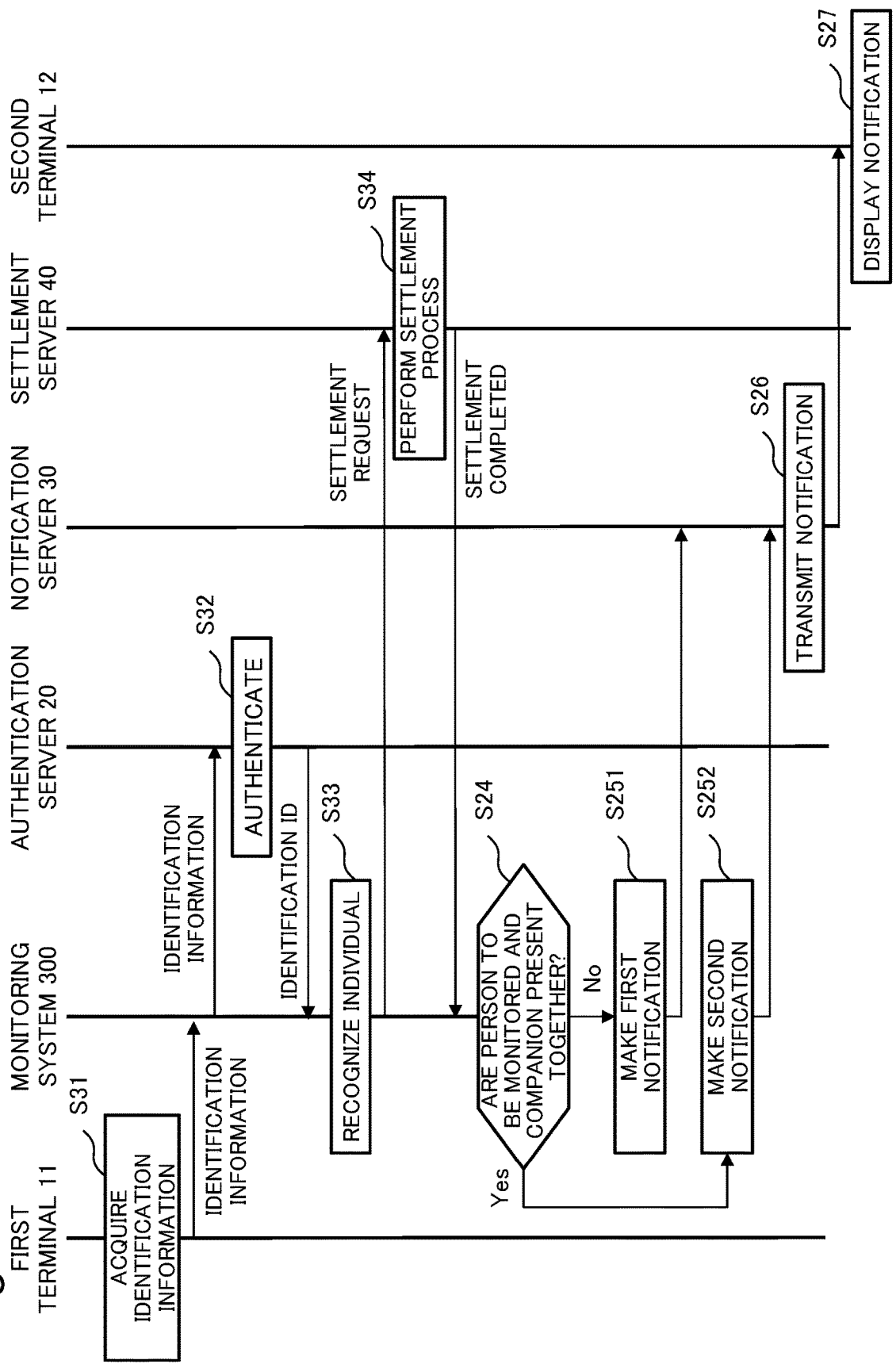
FIG. 14 is a sequence diagram illustrating an operation of an information system 2 according to the third example embodiment.

FIG. 14 is a sequence diagram illustrating an operation of the information system 2 according to the third example embodiment. In the following operation example, a case where the recognition unit 301 recognizes the person to be monitored and the registered companion using the authentication result acquired for settlement will be described.

The acquisition unit 111 of the first terminal 11 acquires identification information in order to make a settlement (step S31). The settlement unit 303 receives the acquired identification information to transmit the identification information to the authentication server 20. The authentication server 20 performs authentication based on the identification information acquired for settlement and the information stored in the identification information DB (step S32). The settlement unit 303 delivers the received identification ID to the recognition unit 301 and the notification unit 302.

The recognition unit 301 receives an identification ID that is an authentication result from the authentication server 20, and recognizes an individual (step S33). The recognition unit 301 recognizes whether the recognized individual is a person to be monitored and a registered companion. Next, the recognition unit 301 determines whether the person to be monitored and the registered companion are present together.

The settlement unit 303 refers to the user DB and makes a settlement by a payment method associated with the identification ID. For example, the settlement unit 303 transmits a settlement request to the settlement server 40. The settlement server 40 executes a settlement process (step S34). The settlement server 40 transmits, for example, the completion of the settlement to the monitoring system 300 as a result of the settlement.

Since the subsequent processing is similar to the processing from step S24 to step S27 according to the second example embodiment, the description thereof will be omitted.

Since the processing of the recognition unit 301 in a case where the recognition unit 301 recognizes the person to be monitored and the registered companion using the identification information acquired for settlement is similar to the processing of the recognition unit 101 according to the first and second example embodiments, the description thereof will be omitted. The settlement unit 303 makes a settlement, for example, based on the identification ID received by the recognition unit 301 from the authentication server, as in step S34 described above.

(Effects)

According to the third example embodiment, it is possible to make appropriate notification according to whether the person to be monitored is present together with the registered companion. Specifically, for example, it is possible to make an appropriate notification to the person who is to receive the notification of the person to be monitored. This is because the first notification unit 212 makes the first notification in a case where it is recognized that the person to be monitored and the registered companion are not present together, and the second notification unit 222 makes the second notification different from the first notification in a case where it is recognized that the person to be monitored and the registered companion are present together.

According to the third example embodiment, it is convenient since the settlement and the confirmation of the safety of the person to be monitored can be simultaneously performed. The reason is that the recognition unit 301 recognizes the person to be monitored and the registered companion using the identification information acquired for settlement. Alternatively, this is because the recognition unit 301 recognizes the person to be monitored and the registered companion using the authentication result acquired for settlement.

Furthermore, according to the third example embodiment, the person who has received the notification can feel relieved when the person to be monitored makes a settlement. It is possible to provide a sense of security when the person to be monitored makes a settlement by himself/herself. The reason is that the notification unit 302 makes a notification regarding the settlement made by the person to be monitored.

Fourth Example Embodiment

As fourth example embodiment, a basic configuration of the first example embodiment will be described. The configuration of the monitoring system 100 according to the fourth example embodiment is as illustrated in FIG. 2. The monitoring system 100 includes a recognition unit 101 and a notification unit 102. The recognition unit 101 and the notification unit 102 may be achieved by a single information processing device or may be achieved by a combination of a plurality of devices.

The recognition unit 101 recognizes a person to be monitored and a companion (registered companion) associated with the person to be monitored. When the person to be monitored is recognized, the notification unit 102 makes a notification to a predetermined contact detail. However, in a case where it is recognized that the person to be monitored and the registered companion are present together, the notification unit 102 stops a notification.

The monitoring system 100 may include any of the first terminal 11, the authentication server 20, and the notification server 30 according to the first example embodiment. The monitoring system 100 may include another device.

Figure 15:
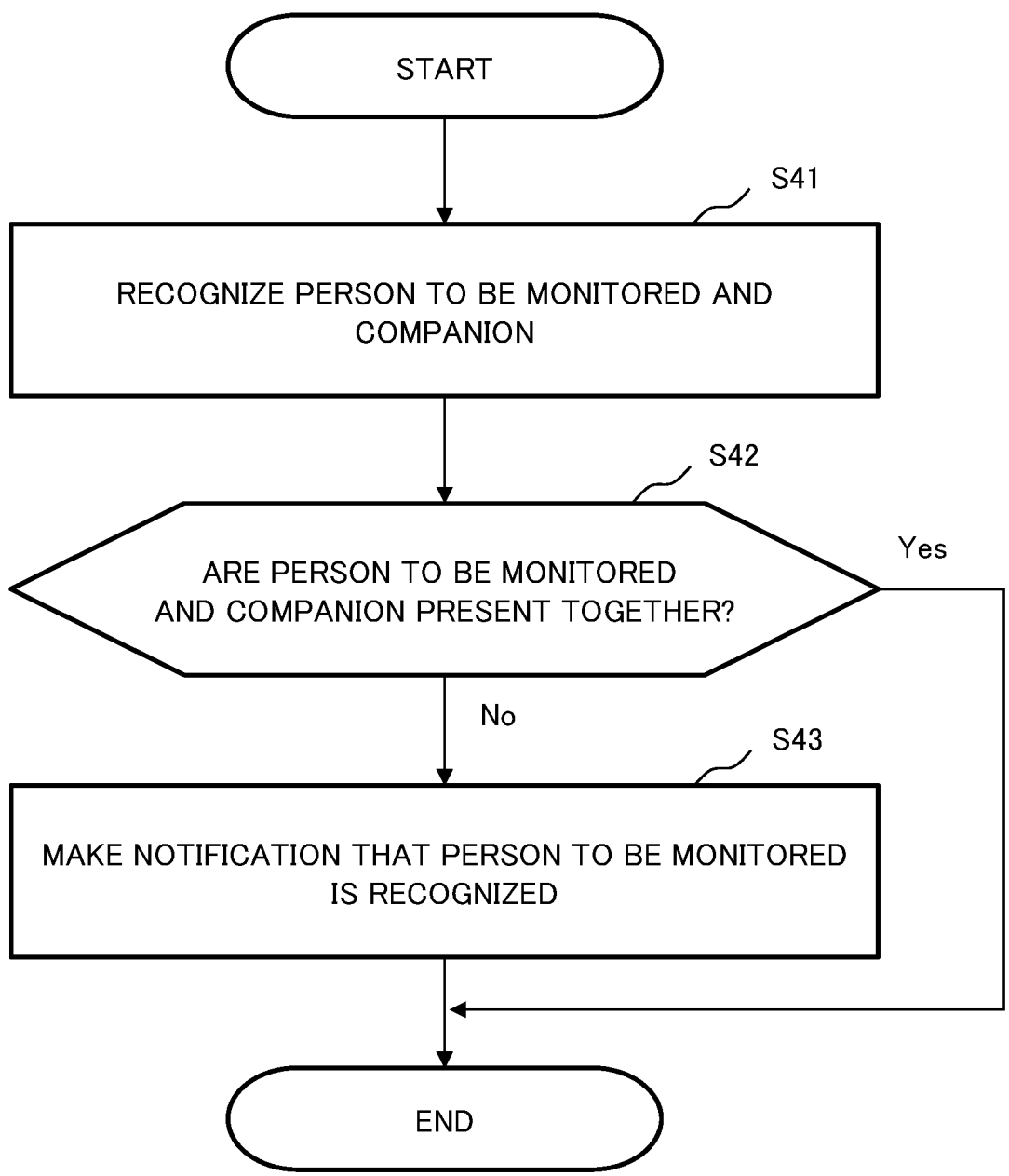
FIG. 15 is a flowchart illustrating an operation example of a monitoring system 100 according to the fourth example embodiment.

FIG. 15 is a flowchart illustrating an operation example of the monitoring system 100 according to the fourth example embodiment. The recognition unit 101 recognizes the person to be monitored and the registered companion (step S41). The recognition unit 101 recognizes that the person to be monitored is not present together with the registered companion or is present together with the registered companion. When the person to be monitored is not present together with the registered companion (step S42: No), the notification unit 102 makes a notification that the person to be monitored has been recognized (step S43). In a case where the person to be monitored is present together with the registered companion (step S42: Yes), the notification unit 102 does not make a notification.

According to the fourth example embodiment, it is possible to make an appropriate notification according to whether the person to be monitored is present together with the registered companion. Specifically, for example, it is convenient because the person who is to receive the notification of the person to be monitored does not need to perform the setting every time when the notification is unnecessary. The reason is that the recognition unit 101 recognizes the person to be monitored and the registered companion, the notification unit 102 make a notification when the person to be monitored is recognized, and does not make a notification in a case where it is recognized that the person to be monitored and the registered companion are present together.

Fifth Example Embodiment

Figure 16:
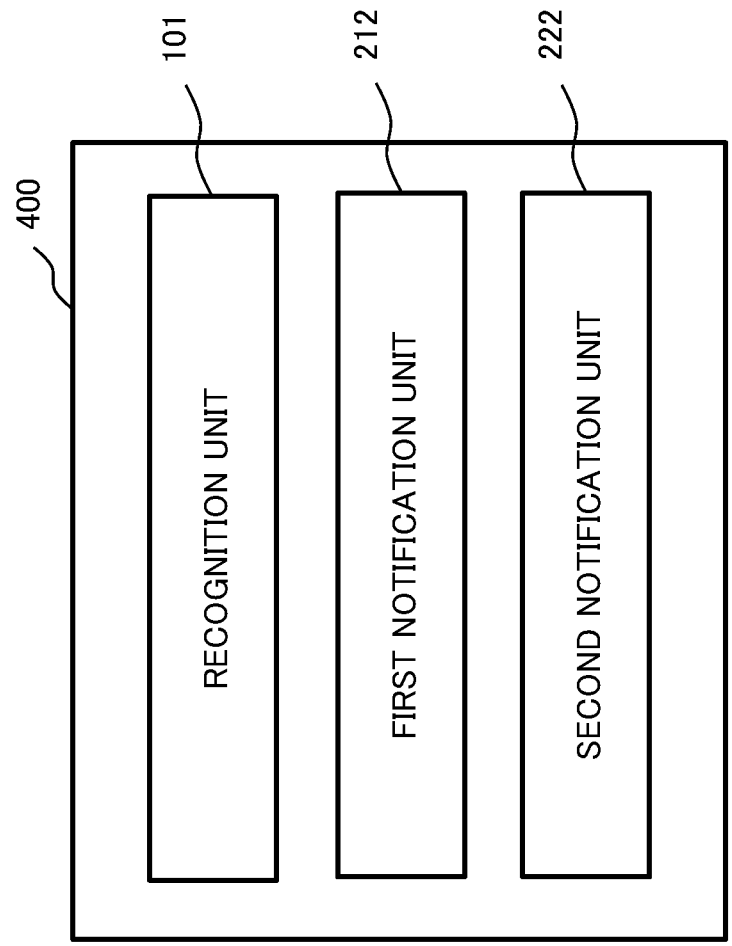
FIG. 16 is a block diagram illustrating a configuration of a monitoring system 400.

As a fifth example embodiment, basic configurations of the second and third example embodiments will be described. FIG. 16 is a block diagram illustrating a configuration of a monitoring system 400 according to the fifth example embodiment. The monitoring system 400 includes the recognition unit 101, the first notification unit 212, and the second notification unit 222. The recognition unit 101, the first notification unit 212, and the second notification unit 222 may be achieved by a single information processing device or may be achieved by a combination of a plurality of devices.

The recognition unit 101 recognizes a person to be monitored and a companion (registered companion) associated with the person to be monitored. The first notification unit 212 makes the first notification in a case where it is recognized that the person to be monitored and the registered companion are not present together. In a case where it is recognized that the person to be monitored and the registered companion are present together, the second notification unit 222 makes a second notification different from the first notification.

Figure 17:
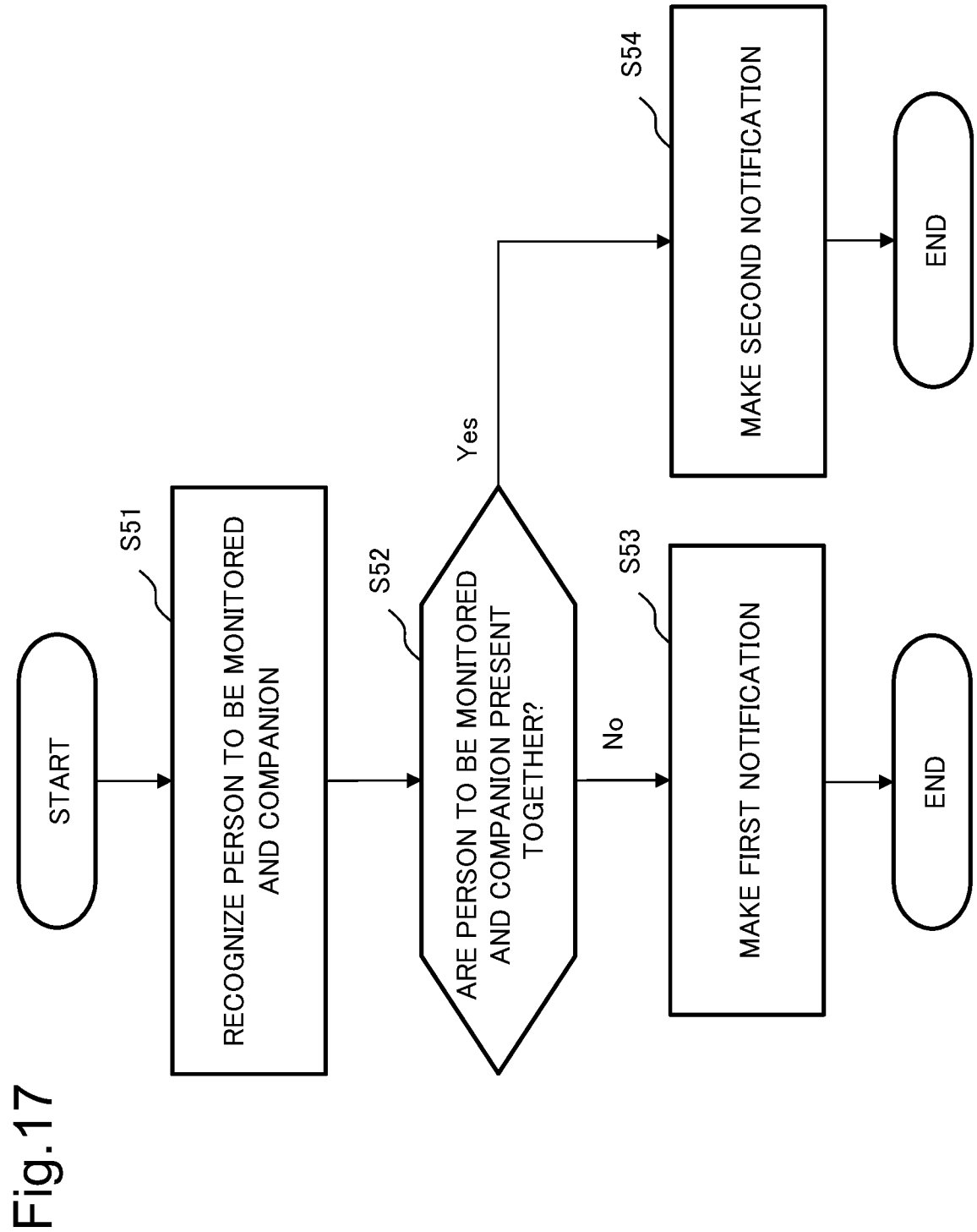
FIG. 17 is a flowchart illustrating an operation example of the monitoring system 400 according to the fifth example embodiment.

FIG. 17 is a flowchart illustrating an operation example of the monitoring system 400 according to the fifth example embodiment. The recognition unit 101 recognizes the person to be monitored and the registered companion (step S51). The recognition unit 101 recognizes that the person to be monitored is not present together with the registered companion or is present together with the registered companion. When the person to be monitored is not present together with the registered companion (step S52: No), the first notification unit 212 makes the first notification (step S53). When the person to be monitored is present together with the registered companion (step S52: Yes), the second notification unit 222 makes the second notification (step S54).

According to the fifth example embodiment, it is possible to make an appropriate notification according to whether the person to be monitored is present together with the registered companion. Specifically, for example, it is possible to make an appropriate notification to the person who is to receive the notification of the person to be monitored. This is because the first notification unit 212 makes the first notification in a case where it is recognized that the person to be monitored and the registered companion are not present together, and the second notification unit 222 makes the second notification different from the first notification in a case where it is recognized that the person to be monitored and the registered companion are present together.

[Modifications]

Each of the above-described example embodiments can be modified, for example, as shown in the following modifications.

(First Modification) Registration in User DB and Identification Information DB

In order to register information in the user DB and the identification information DB, the monitoring system 100, 200, 300 may further include a registration unit. For example, the registration unit provides the second terminal 12 with an application screen or a web page for performing registration. The user inputs the contact detail, the identification information of the person to be monitored and the registered companion, and other necessary information via the second terminal 12. When the face image is used as the identification information, the identification information may be input by imaging the person to be monitored and the registered companion by the camera included in the second terminal 12. The second terminal 12 transmits the input information to the monitoring system 100, 200, 300.

The registration unit registers the information received from the second terminal 12 in the user DB and the identification information DB. Although the case where the information is registered via the second terminal 12 is described, the registration may be similarly performed via the first terminal 11.

(Second Modification) Registration of Notification Destination

In a case where a plurality of registered companions is registered in the user DB for one person to be monitored, different contact details may be registered for respective registered companions. For example, a case where registered companions C1 and C2 are registered in association with a person to be monitored A1 will be described. For the person to be monitored A1, the contact detail of the registered companion C2 may be registered in association with the registered companion C1, and the contact detail of the C1 may be registered in association with the registered companion C2. According to this, for example, in the second example embodiment, when the recognition unit 101 recognizes that the person to be monitored A and the registered companion C1 are present together, the notification unit 202 makes a notification to the contact detail of the registered companion C2.

(Third Modification) Type of Identification Information

The acquisition unit 111 may acquire an identifier of a mobile terminal such as a radio frequency identifier (RFID) tag, an integrated circuit (IC) card, or a smartphone as the identification information. In this case, the acquisition unit 111 may be a tag reader, a card reader, or a near field communication (NFC) reader.

Further, the acquisition unit 111 may be, as the identification information, a personal ID input by the user via an input device connected to the first terminal 11. The personal ID is an identifier for uniquely identifying the user, and may be common to the identification ID. Acquisition unit 111 may acquire the authentication information together with the personal ID, which is the identification information, to transmit the authentication information to the monitoring system 100. The authentication information is, for example, a passcode, a password, a personal identification number (PIN) code, and the like registered in advance in the authentication server 20 for improving security of the identification information. For example, as in the identification information, the authentication information is input by the user via the input device.

The monitoring system 100 transmits the identification information and the authentication information acquired by the acquisition unit 111 to the authentication server 20. The authentication server 20 collates the identification information and the authentication information with the information registered in advance to transmit an authentication result to the monitoring system 100.

(Fourth Modification) Recognition of Person to be Monitored and Registered Companion In the above example embodiment, the case where each of the recognition units 101 and 301 determines whether the authenticated person is a person to be monitored or a registered companion and whether the person to be monitored is present together with the registered companion is described. However, each of the recognition units 101 and 301 may receive a result of determining the above matter from the authentication server 20. In this case, the authentication server 20 stores the person to be monitored and the registered companion in association with each other in advance.

The authentication server 20 may receive the identification information from the first terminal 11. In the fourth modification, the authentication server 20 determines whether the person whose identification information is acquired is the person to be monitored, or the registered companion, and whether the person to be monitored is present together with the registered companion. The authentication server 20 transmits the determination result to the recognition units 101 and 301.

(Fifth Modification) Face Expression Analysis

Each of the above example embodiments may include a face expression analysis unit. The face expression analysis unit analyzes the face image to estimate the face expression using an any estimation technique, and determines whether the person to be monitored is in trouble. For example, the face expression analysis unit extracts feature points of the face such as eyes, eyebrows, nose, and mouth, and estimates happiness, surprise, confusion, and the like from the face expression. The face expression analysis unit may calculate a smile score, a degree of surprise, and a degree of confusion. The face expression analysis unit may determine that the person to be monitored is in trouble when the calculated degree of confusion exceeds a predetermined value. The face expression analysis unit may estimate the emotion using a plurality of continuous face images. By using the plurality of images, for example, the degree of trouble of the person to be monitored can be more accurately confirmed, and erroneous determination of the degree of confusion can be suppressed. Each of the above-described notification units may make a notification according to the emotion of the person to be monitored.

(Sixth Modification) Notification of Late Arrival

In each example embodiment, the notification unit may make a notification regarding late arrival. The notification regarding the late arrival may include, for example, that the person to be monitored is late, that the person to be monitored has a possibility of being late, that the person to be monitored was late, the estimated time of arrival, or the time of arrival. In this case, for example, the user DB may include a time limit of the person to be monitored. The time limit is, for example, "recognize the person to be monitored during 8:00 to 8:30". The user DB may include the arrival position of the person to be monitored and the time at which the person to be monitored should arrive.

The recognition units 101 and 301 further refer to the user DB and the time when the person to be monitored is recognized, and recognize that the person to be monitored is late, that the person to be monitored has a possibility of being late, that the person to be monitored was late, the estimated time of arrival, or the time of arrival. For example, the recognition units 101 and 301 may calculate the time until arrival based on the time at which the person to be monitored is recognized and its position, and the arrival position of the person to be monitored and the time at which the person to be monitored should arrive, and recognize the late arrival of the person to be monitored.

As a modification of the first example embodiment, the notification unit 102 makes a notification when it is recognized that the person to be monitored will be late. However, in a case where the person to be monitored is present together with the registered companion, the notification unit 102 does not make a notification of late arrival.

As a modification of the second and third example embodiments, the first notification unit 212, 312 and the second notification unit 222, 322 make a notification of different destinations or different message contents regarding the late arrival depending on whether the person to be monitored is present together with the registered companion. For example, the first notification may be destined for a guardian and a school, and the second notification may be destined for a school. The content of the first notification is, for example, "(the person to be monitored) got on the bus at 8:35, and will be late for school". The content of the second notification is, for example, "(the person to be monitored) and (the registered companion) passed (place) together although they are late".

(Seventh Modification) Function and Database of Monitoring System

In the first to third example embodiments, the monitoring system 100, 200, 300, the first terminal 11, the authentication server 20, the notification server 30, and the settlement server 40 are implemented by different devices. However, some or all of the functions of the first terminal 11, the authentication server 20, the notification server 30, and the settlement server 40 may be included in each of the monitoring system 100, 200, 300.

The user DB referred to by the monitoring system 100, 200, 300 and the identification information DB referred to by the authentication server 20 may be included in the storage unit of the monitoring system 100, 200, 300.

[Hardware Configuration]

In each of the above-described example embodiments, each component of the monitoring system 100, 200, 300, 400 indicates a block of functional units. Some or all of the components of each device (monitoring system, authentication server, notification server, settlement server, first terminal, and second terminal) may be achieved by an any combination of the computer 500 and a program.

Figure 18:
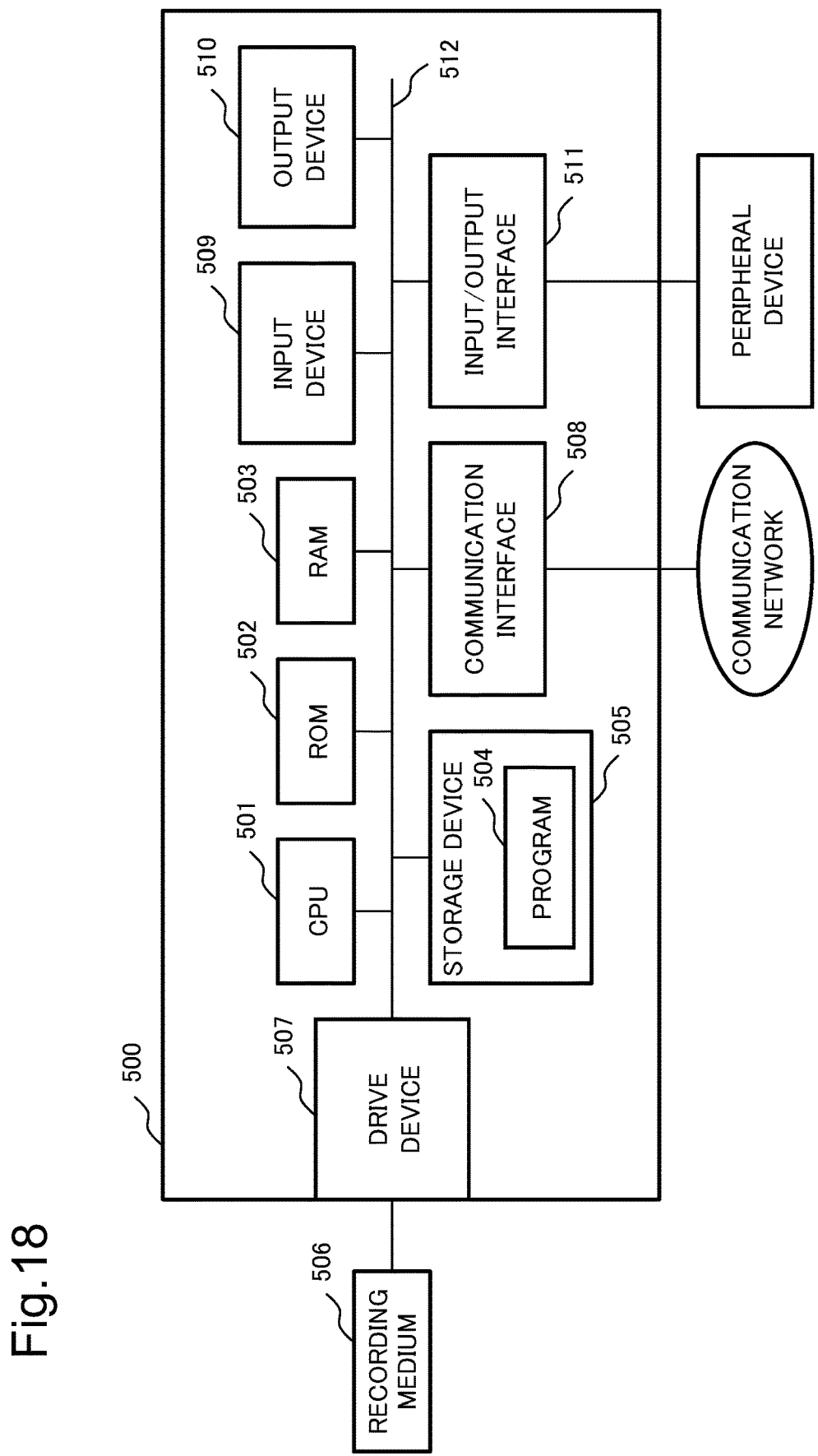
FIG. 18 is a block diagram illustrating an example of a hardware configuration of a computer 500.

FIG. 18 is a block diagram illustrating an example of a hardware configuration of the computer 500. Referring to FIG. 18, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes an instruction for achieving each function of each device. The program 504 is stored in advance in the ROM 502, the RAM 503, and the storage device 505. The CPU 501 achieves each function of each device by executing instructions included in the program 504. For example, the CPU 501 of the monitoring system 100 executes a command included in the program 504 to implement the function of the monitoring system 100. The RAM 503 may store data to be processed in each function of each device. For example, the identification information in the monitoring system 100 may be stored in the RAM 503 of the computer 500.

The drive device 507 reads and writes the recording medium 506. The communication interface 508 provides an interface with a communication network. The input device 509 is, for example, a mouse, a keyboard, or the like, and receives an input of information from a system administrator or a user. The output device 510 is, for example, a display to output (displays) information to a user, an administrator, or the like. The input/output interface 511 provides an interface with a peripheral device. The bus 512 connects the components of the hardware. The program 504 may be supplied to the CPU 501 via a communication network, or may be stored in the recording medium 506 in advance, read by the drive device 507, and supplied to the CPU 501.

The hardware configuration illustrated in FIG. 18 is an example, and other components may be added or some components may not be included.

There are various modifications of the implementation method of each device. For example, each device may be achieved by an any combination of a computer and a program different for each component. A plurality of components included in each device may be achieved by any combination of one computer and a program.

Some or all of the components of each device may be achieved by general-purpose or dedicated circuitry including a processor or the like, or a combination thereof. These circuits may be configured by a single chip or may be configured by a plurality of chips connected via a bus. Part or all of each component of each device may be achieved by a combination of the above-described circuit or the like and the program.

In a case where part or all of each component of each device is achieved by a plurality of computers, circuits, and the like, the plurality of computers, circuits, and the like may be disposed in a centralized manner or in a distributed manner.

At least part of the information system and the monitoring system may be provided in a software as a service (SaaS) format. That is, at least part of the functions for implementing the information system and the monitoring system may be executed by software executed via the network.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims. The configurations in the different example embodiments can be combined with without departing from the scope of the present disclosure.

Some or all of the above example embodiments may be described as the following Supplementary Notes, but are not limited to the following.

[Supplementary Note 1]

A monitoring system including a recognition means configured to recognize a person to be monitored and a registered companion associated with the person to be monitored, and a notification means configured to makes a notification, to a predetermined contact detail, that the person to be monitored has been recognized, wherein the notification means stops a notification to the contact detail in a case where it is recognized that the person to be monitored and the registered companion are present together.

[Supplementary Note 2]

A monitoring system including a recognition means configured to recognize a person to be monitored and a registered companion associated with the person to be monitored, a first notification means configured to make a first notification in a case where it is recognized that the person to be monitored and the registered companion are not present together, and a second notification means configured to make a second notification different from the first notification in a case where it is recognized that the person to be monitored and the registered companion are present together.

[Supplementary Note 3]

The monitoring system according to Supplementary Note 2, wherein
the first notification includes a fact that the person to be monitored is not present together with the registered companion, and
the second notification includes a fact that the person to be monitored and the registered companion are present together.

[Supplementary Note 4]

The monitoring system according to Supplementary Note 2 or 3, wherein
the first notification means performs a notification to a first contact detail, and
the second notification means makes a notification to a second contact detail different from the first contact detail.

[Supplementary Note 5]

The monitoring system according to any one of Supplementary Notes 2 to 4, wherein the first notification includes additional information related to the person to be monitored, and the second notification does not include the additional information.

[Supplementary Note 6]

The monitoring system according to Supplementary Note 5, wherein the first notification includes a face image used for recognition of the person to be monitored, as the additional information.

[Supplementary Note 7]

The monitoring system according to any one of Supplementary Notes 1 to 6, wherein the recognition means recognizes the person to be monitored and the registered companion based on a face image captured at a predetermined place.

[Supplementary Note 8]

The monitoring system according to any one of Supplementary Notes 1 to 7, wherein the recognition means recognizes the person to be monitored and the registered companion using an authentication result acquired for settlement.

[Supplementary Note 9]

The monitoring system according to any one of Supplementary Notes 1 to 8, further including
a settlement means configured to make a settlement using identification information, wherein
the recognition means recognizes the person to be monitored and the registered companion based on the identification information acquired for settlement.

[Supplementary Note 10]

The monitoring system according to any one of Supplementary Notes 1 to 9, further including
a settlement means configured to make a settlement using a face image, wherein
the recognition means recognizes the person to be monitored and the registered companion based on the face image acquired for settlement.

[Supplementary Note 11]

The monitoring system according to Supplementary Note 2, wherein
the first notification includes a fact that settlement has been made by the person to be monitored while the registered companion is not present together with the person to be monitored, and
the second notification includes a fact that settlement has been made by the person to be monitored while the registered companion is present together with the person to be monitored.

[Supplementary Note 12]

The monitoring system according to Supplementary Note 1, wherein
the recognition means recognizes the person to be monitored and the registered companion based on a face image captured at a predetermined place, and further determines whether the person to be monitored is in trouble based on the face image, and
the notification means performs a notification to the contact detail in a case where it is determined that the person to be monitored is in trouble.

[Supplementary Note 13]

The monitoring system according to Supplementary Note 2, wherein
the recognition means recognizes the person to be monitored and the registered companion based on a face image captured at a predetermined place, and further determines whether the person to be monitored is in trouble based on the face image, and
the first notification means and the second notification means perform the first notification or the second notification in a case where it is determined that the person to be monitored is in trouble.

[Supplementary Note 14]

A method of monitoring a person, the method including
recognizing a person to be monitored and a registered companion associated with the person to be monitored,
making a notification, to a predetermined contact detail, that the person to be monitored has been recognized and
stopping a notification to the contact detail in a case where it is recognized that the person to be monitored and the registered companion are present together.

[Supplementary Note 15]

A method of monitoring a person, the method including
recognizing a person to be monitored and a registered companion associated with the person to be monitored,
making a first notification in a case where it is recognized that the person to be monitored and the registered companion are not present together, and
making a second notification different from the first notification in a case where it is recognized that the person to be monitored and the registered companion are present together.

[Supplementary Note 16]

A recording medium that non-transiently records a program for causing a computer to execute the steps of
recognizing a person to be monitored and a registered companion associated with the person to be monitored, and
making a notification, to a predetermined contact detail, that the person to be monitored has been recognized and stopping a notification to the contact detail in a case where it is recognized that the person to be monitored and the registered companion are present together.

[Supplementary Note 17]

A recording medium that non-transiently records a program for causing a computer to execute the steps of
recognizing a person to be monitored and a registered companion associated with the person to be monitored,
making a first notification in a case where it is recognized that the person to be monitored and the registered companion are not present together, and making a second notification different from the first notification in a case where it is recognized that the person to be monitored and the registered companion are present together.

[Supplementary Note 18]

A monitoring system including a recognition means configured to recognize a person to be monitored and a protection responsible person of the person to be monitored, and a notification means configured to make a notification to a terminal of the protection responsible person when the person to be monitored is recognized at a predetermined place, wherein the notification means stops a notification to the terminal of the protection responsible person in a case where it is recognized that the person to be monitored and the protection responsible person are present together.

[Supplementary Note 19]

A monitoring system including recognition means configured to recognize a person to be monitored and a protection responsible person of the person to be monitored at an entrance or an exit of a facility or a vehicle, a settlement means configured to make a settlement based on a result of recognizing the person to be monitored, and a notification means configured to perform a notification to a terminal of the protection responsible person when the person to be monitored is recognized at the entrance or the exit, wherein the notification means stops a notification to the terminal of the protection responsible person in a case where it is recognized that the person to be monitored and the protection responsible person are present together.

[Supplementary Note 20]

The monitoring system according to Supplementary Note 1, wherein the notification means performs a notification, to the contact detail, of late arrival when it is recognized that the person to be monitored is late, and stops a notification about the late arrival in a case where the person to be monitored and the registered companion are present together.

REFERENCE SIGNS LIST 1, 2 information system
100, 200, 300, 400 monitoring system
11 first terminal
12 second terminal
20 authentication server
30 notification server
40 settlement server
500 computer

What is claimed is:

1. A monitoring system comprising:
one or more memories storing instructions; and
one or more processors configured to execute the instructions to:
recognize a person to be monitored and a registered companion associated with the person to be monitored;
perform a first notification in a case where it is recognized that the person to be monitored and the registered companion are not present together; and
perform a second notification different from the first notification in a case where it is recognized that the person to be monitored and the registered companion are present together, wherein recognize the person to be monitored and the registered companion is based on a face image captured at a predetermined place, and further determines whether the person to be monitored is in trouble based on the face image, and
perform the first notification or the second notification is executed in a case where it is determined that the person to be monitored is in trouble.

2. The monitoring system according to claim 1, wherein the first notification includes a fact that the person to be monitored is not present together with the registered companion, and
the second notification includes a fact that the person to be monitored and the registered companion are present together.

3. The monitoring system according to claim 1, wherein perform a notification to a first contact detail, and
perform a notification to a second contact detail different from the first contact detail.

4. The monitoring system according to claim 1, wherein the first notification includes additional information related to the person to be monitored, and the second notification does not include the additional information.

5. The monitoring system according to claim 4, wherein the first notification includes, as the additional information, a face image used for recognition of the person to be monitored.

6. The monitoring system according to claim 1,
wherein the one or more processors are configured to execute the instructions to recognize the person to be monitored and the registered companion based on a face image captured at a predetermined place.

7. The monitoring system according to claim 1,
wherein the one or more processors are configured to execute the instructions to recognize the person to be monitored and the registered companion using an authentication result acquired for settlement.

8. The monitoring system according to claim 1, wherein the one or more processors are configured to execute the instructions to:
make a settlement using identification information; and
recognize the person to be monitored and the registered companion based on the identification information acquired for settlement.

9. The monitoring system according to claim 1, wherein the one or more processors are configured to execute the instructions to:
make a settlement using a face image; and
recognize the person to be monitored and the registered companion based on the face image acquired for settlement.

10. The monitoring system according to claim 1, wherein the first notification includes a fact that settlement has been made by the person to be monitored while the registered companion is not present together with the person to be monitored, and
the second notification includes a fact that settlement has been made by the person to be monitored while the registered companion is present together with the person to be monitored.

11. A monitoring method comprising:
recognizing a person to be monitored and a registered companion associated with the person to be monitored;
by a computer,
making a first notification in a case where it is recognized that the person to be monitored and the registered companion are not present together; and making a second notification different from the first notification in a case where it is recognized that the person to be monitored and the registered companion are present together, wherein recognizing the person to be monitored and the registered companion is based on a face image captured at a predetermined place, and further determines whether the person to be monitored is in trouble based on the face image, and making the first notification or the second notification is executed in a case where it is determined that the person to be monitored is in trouble.

12. A non-transitory recording medium records a program for causing a computer to execute:

recognizing a person to be monitored and a registered companion associated with the person to be monitored;

making a first notification in a case where it is recognized that the person to be monitored and the registered companion are not present together; and making a second notification different from the first notification in a case where it is recognized that the person to be monitored and the registered companion are present together, wherein recognizing the person to be monitored and the registered companion is based on a face image captured at a predetermined place, and further determines whether the person to be monitored is in trouble based on the face image, and making the first notification or the second notification is executed in a case where it is determined that the person to be monitored is in trouble.

* * * * *